(12) United States Patent
Cochran et al.

(10) Patent No.: US 6,354,667 B1
(45) Date of Patent: Mar. 12, 2002

(54) FULL FACE VEHICLE WHEEL AND METHOD FOR PRODUCING SAME

(75) Inventors: Walter K. Cochran, Bowling Green, KY (US); George Kengle, Monroe, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/593,972

(22) Filed: Jun. 13, 2000

(51) Int. Cl.$^7$ ................................................ B60B 3/04
(52) U.S. Cl. ............................ 301/63.104; 301/63.106; 29/894.322
(58) Field of Search ............. 301/63.1, 95; 29/894.322, 29/894.323, 894.32, 894.35, 894.353, 894.351

(56) References Cited

U.S. PATENT DOCUMENTS

| | | | | |
|---|---|---|---|---|
| 5,360,261 A | * | 11/1994 | Archibald et al. | 301/63.1 |
| 5,435,633 A | * | 7/1995 | Jaskierny | 301/63.1 |
| 5,548,896 A | * | 8/1996 | Archibald et al. | 28/894.322 |
| 5,558,407 A | * | 9/1996 | Jaskiery | 301/63.1 |
| 6,030,051 A | * | 2/2000 | Hosoda | 301/63.1 |
| 6,170,918 B1 | * | 1/2001 | Archibald et al. | 301/63.1 |
| 6,213,563 B1 | * | 4/2001 | Heck et al. | 301/63.1 |

FOREIGN PATENT DOCUMENTS

| | | | | |
|---|---|---|---|---|
| EP | 0054931 A2 | * | 6/1982 | 29/894.323 |
| JP | 64-78901 A | * | 3/1989 | 301/63.1 |
| WO | WO-98/28157 A2 | * | 7/1998 | |

OTHER PUBLICATIONS

Avallone and Baumeister, Marks' Standard Handbook for Mechanical Engineers, McGraw Hill, 10th Edition, pp. 6–55.*

* cited by examiner

Primary Examiner—Stephen T. Gordon
Assistant Examiner—Patricia L. Engle
(74) Attorney, Agent, or Firm—MacMillan, Sobanski & Todd, LLC

(57) ABSTRACT

This invention relates to an full face vehicle wheel including a wheel rim joined to a wheel disc. The wheel disc defines an axis and includes a body having a centrally located wheel mounting surface and an outer annular portion. The outer annular portion defines an outboard tire bead seat retaining flange of the full face vehicle wheel, and includes an outer surface and an inner surface. The inner surface of the outer annular portion defines an inner fit up surface of the wheel disc. The wheel rim includes an inboard tire bead seat retaining flange, an inboard tire bead seat, an axially extending well, and an outboard tire bead seat. The outboard tire bead seat terminates at a generally circular shaped outer having a substantially full radius outer diameter along the entire periphery thereof. The circular shaped outer end defines a non-flat point of contact surface. When the outer non-flat point of contact surface of the outer end of the wheel rim is positioned adjacent the inner fit tip surface of the wheel disc, the outer non-flat point of contact surface of the wheel rim abuts the inner fit up surface of the wheel disc at a single point of contact therebetween and at least a portion of the outer surface of the outer end of the wheel rim is spaced from the inner fit up surface of the wheel disc to form a generally annular groove for receiving a weld to join the wheel rim and the wheel disc together and produce the finish full face vehicle wheel.

9 Claims, 12 Drawing Sheets

FULL FACE VEHICLE WHEEL AND METHOD FOR PRODUCING SAME

BACKGROUND OF THE INVENTION

This invention relates in general to vehicle wheels and in particular to an improved full face vehicle wheel and method for producing the same.

A conventional vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim can be fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by welding to produce the vehicle wheel.

A full face vehicle wheel is distinguished from other types of vehicle wheels by having a one-piece wheel disc construction. In particular, the full face wheel includes a "full face" wheel disc and a "partial" wheel rim. The full face wheel disc can be cast, forged, or fabricated from steel, aluminum, or other alloys. The full face wheel disc includes an inner annular wheel mounting portion and an outer annular portion which defines at least a portion of an outboard tire bead seat retaining flange of the vehicle wheel. The wheel mounting portion defines an inboard mounting surface and includes a center pilot or hub hole, and a plurality of lug receiving holes formed therethrough for mounting the vehicle wheel to an axle of the vehicle. The partial wheel rim can be fabricated from steel, aluminum, or other alloys, and includes an inboard tire bead seat retaining flange, an inboard tire bead seat, an axially extending well, and an outboard tire bead seat. In some instances, the outboard tire bead seat of the wheel rim and the outer annular portion of the wheel disc cooperate to form the outboard tire bead seat retaining flange of the full face vehicle wheel. In both types of constructions, the outboard tire bead seat of the wheel rim is positioned adjacent the outer annular portion of the wheel disc and a weld is applied to secure the wheel rim and the wheel disc together to produce the full face vehicle wheel.

SUMMARY OF THE INVENTION

This invention relates to an full face vehicle wheel including a wheel rim joined to a wheel disc. The wheel disc defines an axis and includes a body having a centrally located wheel mounting surface and an outer annular portion. The outer annular portion defines an outboard tire bead seat retaining flange of the full face vehicle wheel, and includes an outer surface and an inner surface. The inner surface of the outer annular portion defines an inner fit up surface of the wheel disc. The wheel rim includes an inboard tire bead seat retaining flange, an inboard tire bead seat, an axially extending well, and an outboard tire bead seat. The outboard tire bead seat terminates at a generally circular shaped outer having a substantially full radius outer diameter along the entire periphery thereof. The circular shaped outer end defines a non-flat point of contact surface. When the outer non-flat point of contact surface of the outer end of the wheel rim is positioned adjacent the inner fit up surface of the wheel disc, the outer non-flat point of contact surface of the wheel rim abuts the inner fit up surface of the wheel disc at a single point of contact therebetween and at least a portion of the outer surface of the outer end of the wheel rim is spaced from the inner fit up surface of the wheel disc to form a generally annular groove for receiving a weld to join the wheel rim and the wheel disc together and produce the finish full face vehicle wheel.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
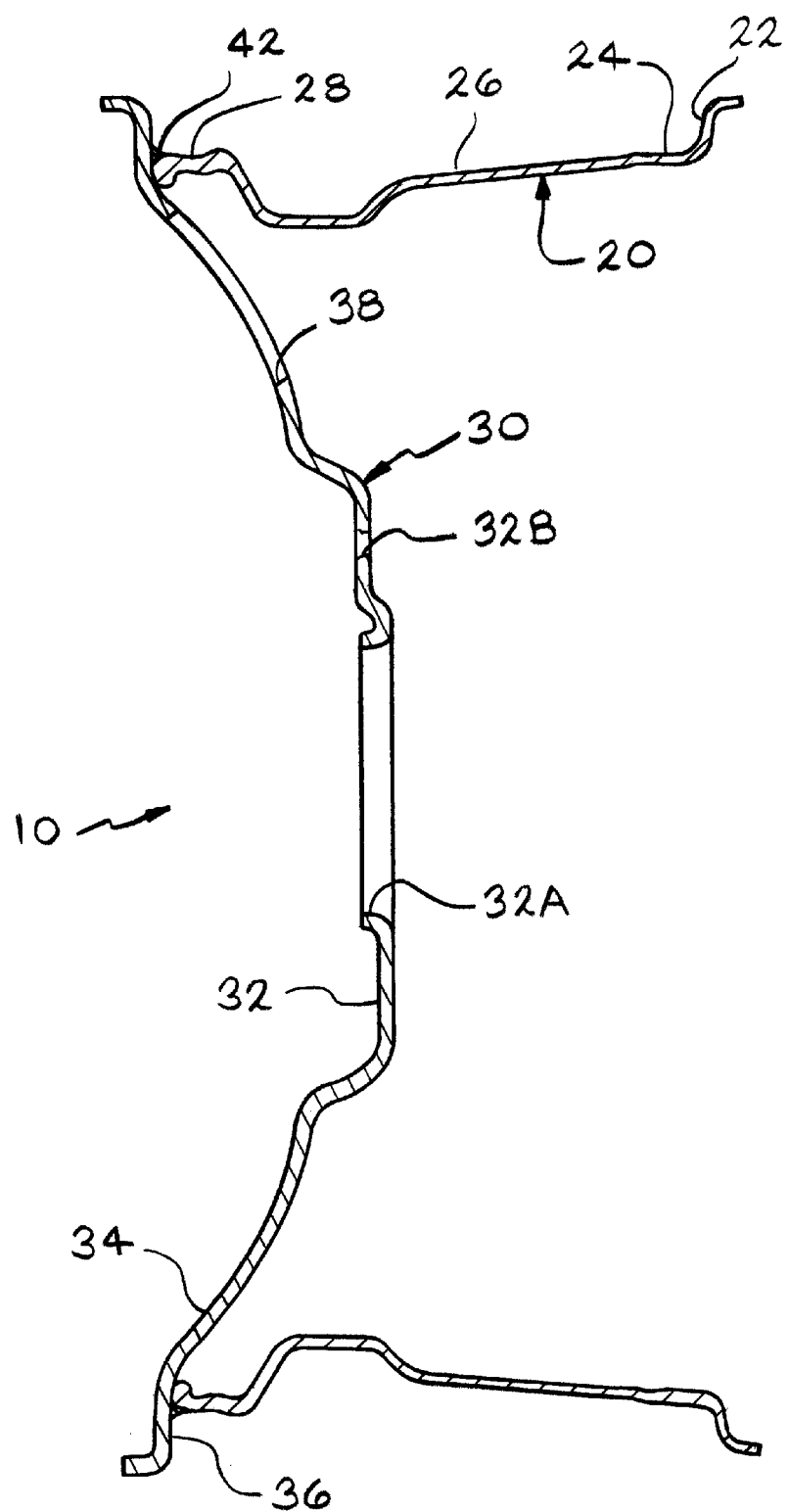
FIG. 1 is a cross-sectional view of a first embodiment of a full face vehicle wheel constructed in accordance with the present invention.

Referring now to the drawings, there is illustrated in FIG. 1 a first embodiment of a vehicle wheel, indicated generally at 10, produced in accordance with the present invention. The vehicle wheel 10 produced according to this invention is illustrated as being a frill face fabricated vehicle wheel. The full face vehicle wheel 10 includes a partial wheel rim 20 and a full face wheel disc 30 which are joined together by a weld 42 during a welding operation.

The wheel rim 20 is a fabricated wheel rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, and an outboard tire bead seat 28.

Figure 2:
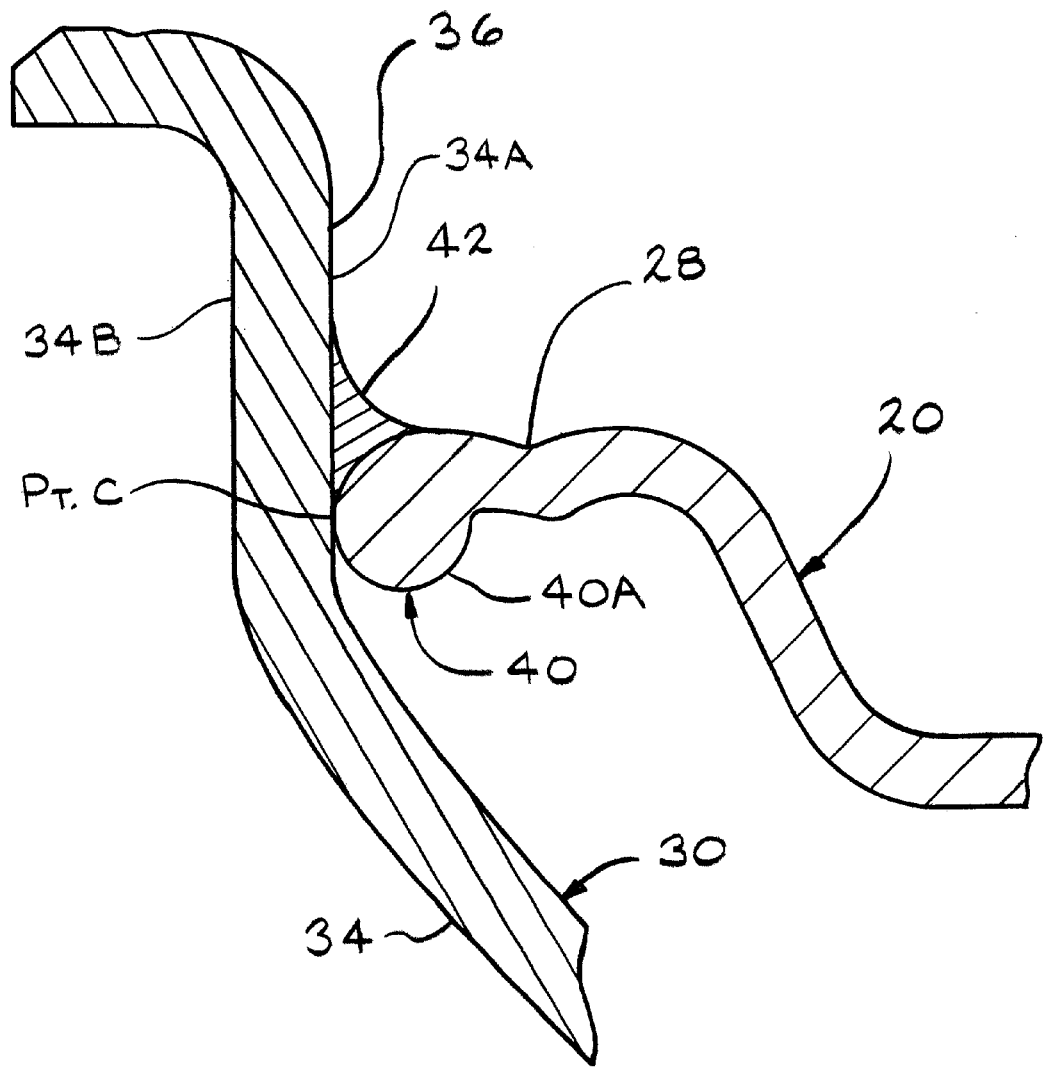
FIG. 2 is an enlarged cross-sectional view of a portion of the wheel illustrated in FIG. 1 and showing a weld joint geometry for joining the wheel rim to the wheel disc to produce the full face vehicle wheel.
Figure 3:
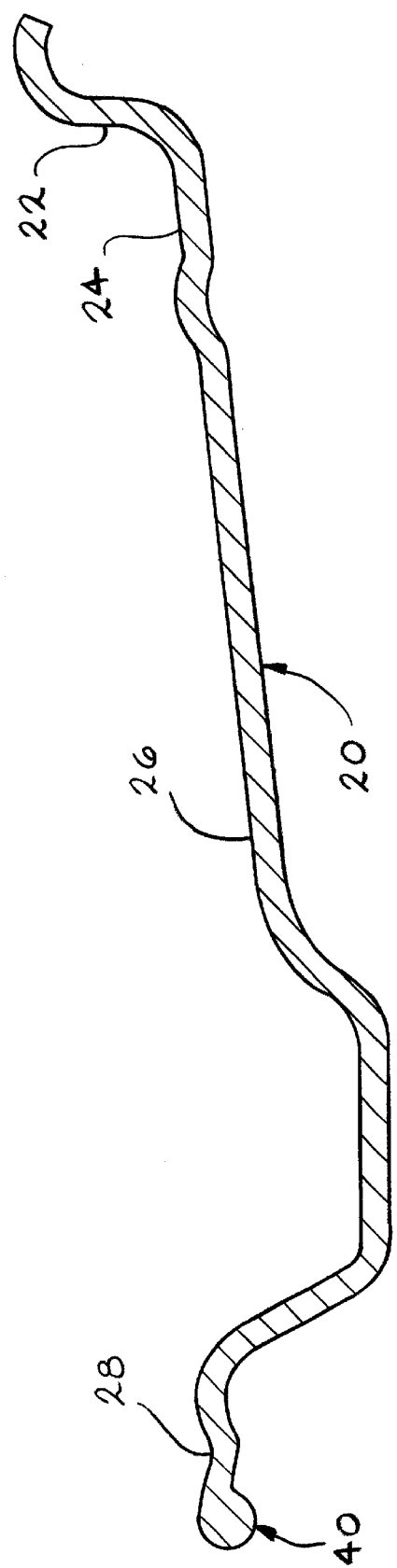
FIG. 3 is a cross-sectional view of the wheel rim shown illustrated in FIGS. 1 and 2.
Figure 4:
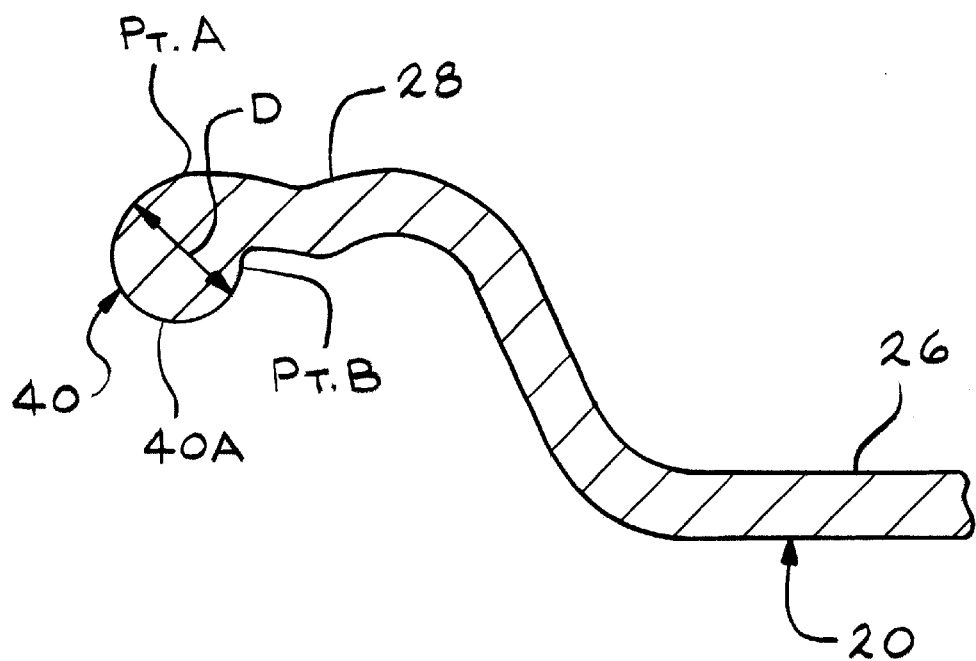
FIG. 4 is a cross-sectional view of a portion of the wheel rim illustrated in FIGS. 1–3.

As best shown in FIGS. 2, 3 and 4, the outboard tire bead seat 28 of the wheel rim 20 of the present invention terminates at an extruded generally circular shaped or "bubble head" shaped outer end, indicated generally at 40. As best shown in FIG. 4, the outer end 40 includes a generally radiused or rounded outer surface 40A which defines a substantially full radius outer diameter D which extends from a approximately a point A to approximately a point B along the outer surface 40A. As will be discussed below in accordance with the present invention, the outer end 40 is formed by a metal forming process, such as the metal forming process shown in FIGS. 5–9. Preferably, the outer end 40 is wholly formed by the metal forming process described below in detail; however, in some instances, it may be necessary to slightly machine a portion of or all of the outer surface 40A of the outer end 40 of the wheel rim 20.

As shown in FIG. 2, the outer surface 40A of the wheel rim outer end 40 defines a rounded or curved rim control or point of contact surface, indicated generally at a point C, which is located somewhere along the outer surface 40A between point A and point B. As will be discussed below, the rounded outer surface 40A defines a generally non-flat outer control surface for positioning the wheel rim 20 relative to the wheel disc 30. Alternatively, the outer end 40 of the wheel rim 20 can be of different shapes or profiles. For example, the outer end could be slightly rounded only at approximately the non-flat point of contact surface C thereof, with the remainder of the outer surface 40A having a different profile. As will be discussed below, the outer point of contact surface C of the wheel rim 20 is provided to define a single point of contact for assembling the wheel rim 20 and the wheel disc 30 thereby allowing for increased design potentials of the associated vehicle wheel 10. Alternatively, the outer point of contact surface C can be located along a different portion of the outer end surface 40A of the wheel rim 20 than that which is illustrated if so desired.

The wheel disc 30 is forged, cast, fabricated, or otherwise formed from a suitable material, such as for example, steel, aluminum or alloys thereof, magnesium, or titanium. The wheel disc 30 includes a generally centrally located wheel mounting portion 32 and an outer annular portion 34. The wheel mounting portion 32 is provided with a centrally located pilot aperture 32A and a plurality of lug bolt receiving holes 32B circumferentially spaced around the pilot aperture 32A (only one of such lug bolt receiving holes 32B being illustrated in FIG. 1). The lug bolt receiving holes 32B receive lug bolts (not shown) and nuts (not shown) for securing the vehicle wheel 10 on an axle (not shown) of a vehicle. The outer annular portion 34 of the wheel disc 30 defines an outboard tire bead seat retaining flange 36 of the vehicle wheel 10. The wheel disc 30 may also include a plurality of decorative openings or windows 38 (only one of such decorative openings 38 illustrated in FIG. 1).

As best shown in FIG. 2, the outer annular portion 34 of the wheel disc 30 includes an inner surface 34A and an outer surface 34B. As will be wheel discussed below, in this embodiment the inner surface 34A of the outer annular portion 34 defines a generally flat "fit-up" surface for receiving the outer point of contact surface C of the outer end 40 of the wheel rim 20. Since the point of contact surface C of the outer end 40 of the wheel rim 20 provides for only a single or distinct point of contact with the fit-up surface 34A of the wheel disc 30, the fit-up surface 34A can generally be of any desired profile. The fit-up surface 34A of the wheel disc 30 is formed by a suitable method, such as for example, by a machining operation or a stamping operation, to precise dimensions.

In the first embodiment shown in FIGS. 1, 2, 3 and 4, the fit-up surface 34A is illustrated as being a generally flat surface; however, the fit-up surface can be of other profiles. For example, as shown in the embodiment illustrated in FIG. 2A, a wheel disc 130' is provided with a generally non-flat surface or curved inner surface 134A' which defines a generally non-flat or curved fit up surface for receiving a control surface 140A' of an outer end 140' of a wheel rim 120'.

To assemble the vehicle wheel 10, the outer point of contact surface C of the outer end 40 of the wheel rim 20 is positioned against the inner fit-up surface 34A of the outer annular portion 34 of the wheel disc 30 in a predetermined desired position and a weld 42 is used to join the wheel rim 20 and the wheel disc 30 together and produce the full face fabricated vehicle wheel 10.

Figure 5:
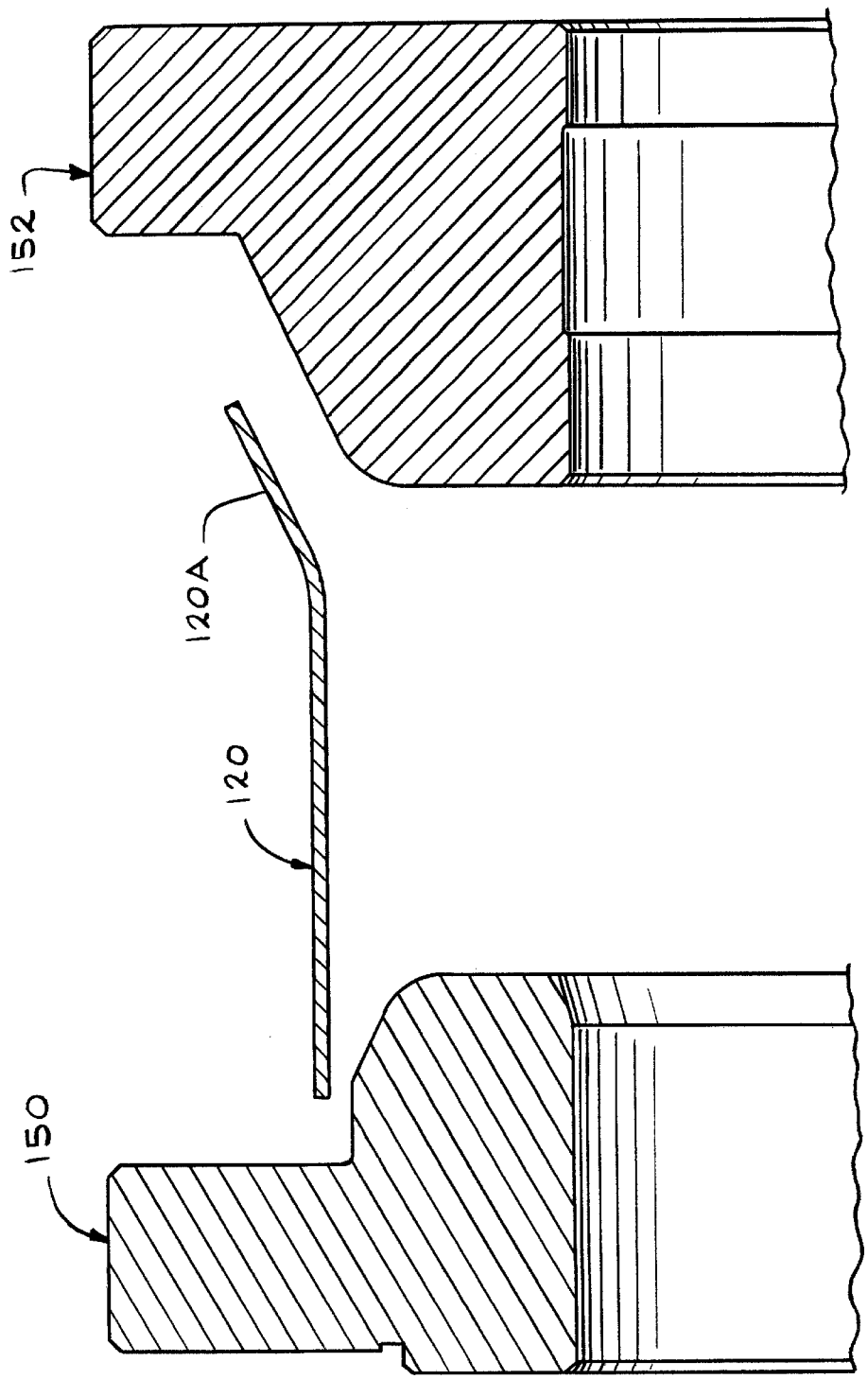
FIG. 5 is a cross sectional view showing an initial flare operation of the disc blank for use in producing the wheel rim illustrated in FIGS. 1–4 in accordance with the present invention.

Turning now to FIGS. 5–10, the method for producing the wheel rim 20 for use in the vehicle wheel 10 of the present invention will be discussed. Initially in step 100, a welded generally cylindrical hoop or band (not shown) formed from a suitable material, such as for example, steel, aluminum or alloys thereof, titanium, or magnesium, is subjected to an expanding and flaring operation to produce a wheel rim preform 120 as shown in FIG. 5. As shown therein, an inboard end 120A of the wheel rim preform 120 is flared upwardly during step 100 by a plurality of die members 150 and 152.

Figure 6:
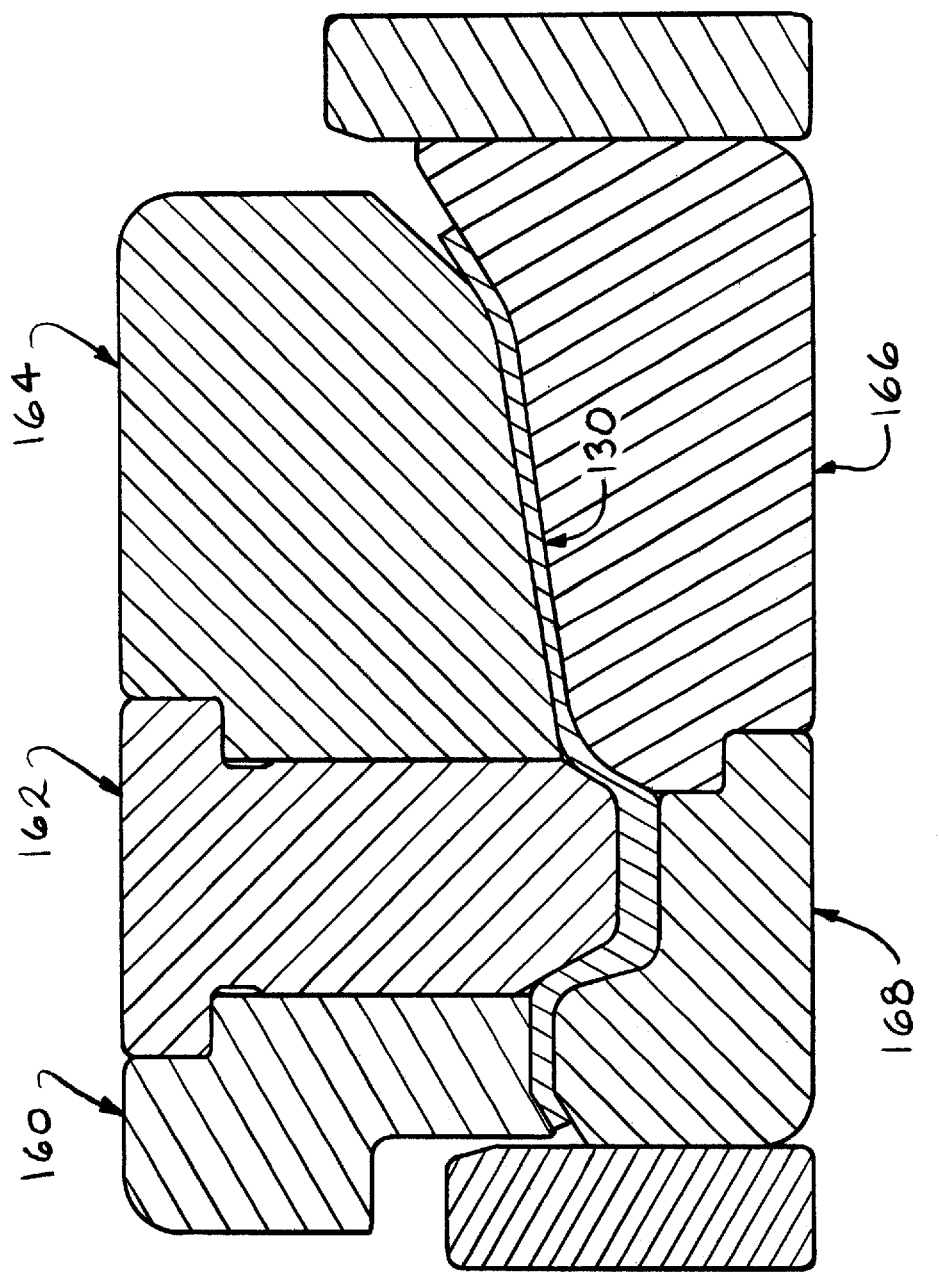
FIG. 6 is a cross sectional view showing an initial roll operation of the flared disc blank into a partially formed wheel rim in accordance with the present invention.
Figure 7:
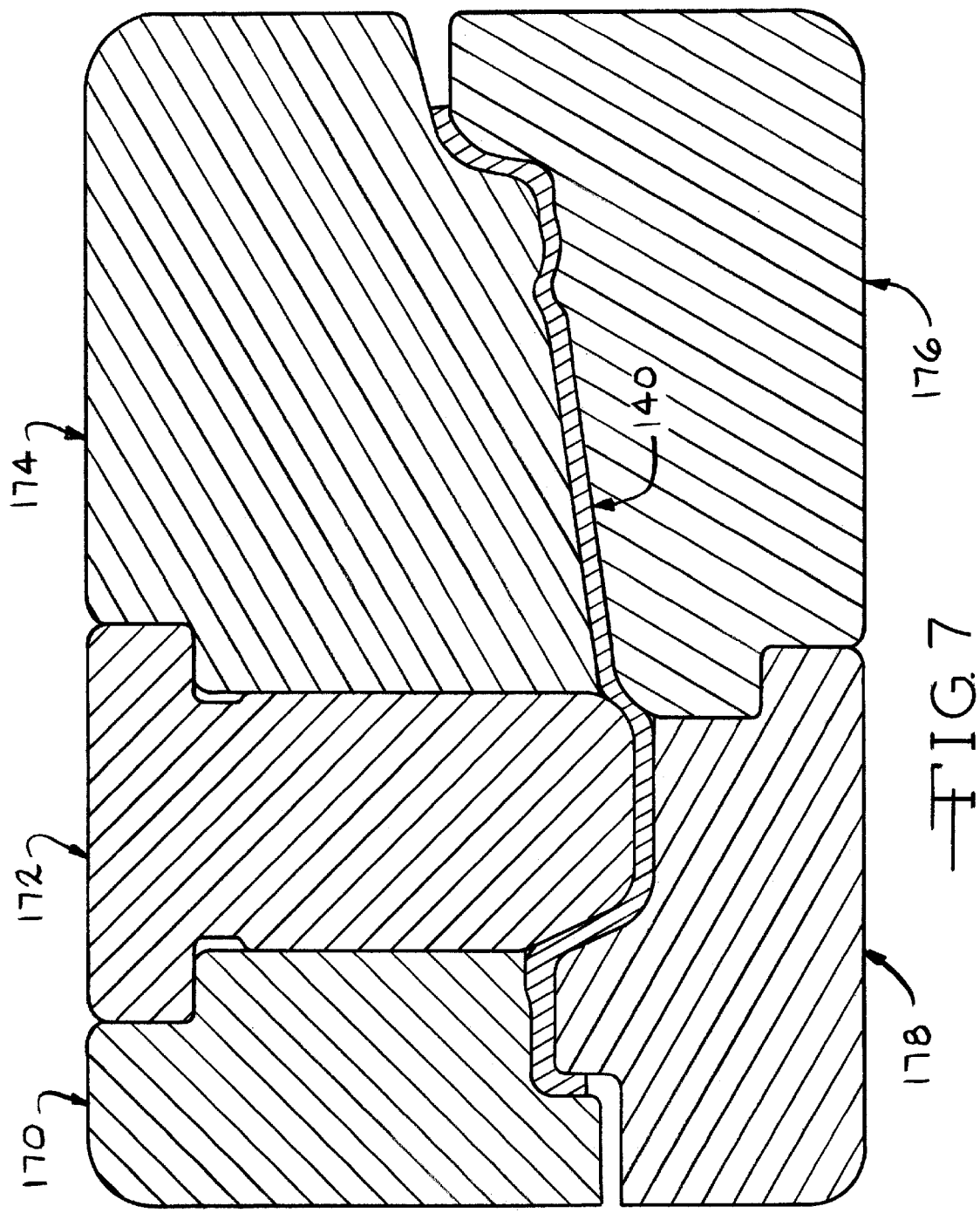
FIG. 7 is a cross sectional view showing an intermediate roll operation of the wheel rim into a partially formed wheel rim in accordance with the present invention.

Following this, in step 102, the wheel rim preform 120 is subjected to an initial metal forming operation to produce a partially formed wheel rim 130 as shown in FIG. 6. As shown therein, the wheel rim preform 120 is supported and engaged by a plurality of die members 160, 162, 164, 166, and 168 during step 102 so as to cause the initial shaping of the wheel rim preform 120 into the desired final wheel rim profile (the final wheel rim profile being illustrated in FIGS. 1, 3 and 9). Next, in step 104, the partially formed wheel rim 130 is subjected to one or more intermediate metal forming operations to produce a partially formed wheel rim 140 as shown in FIG. 7. As shown therein, the partially formed wheel rim 130 is supported and engaged by a plurality of die members 170, 172, 174, 176, and 178 during step 104 to produce the partially formed wheel rim 140.

Figure 8:
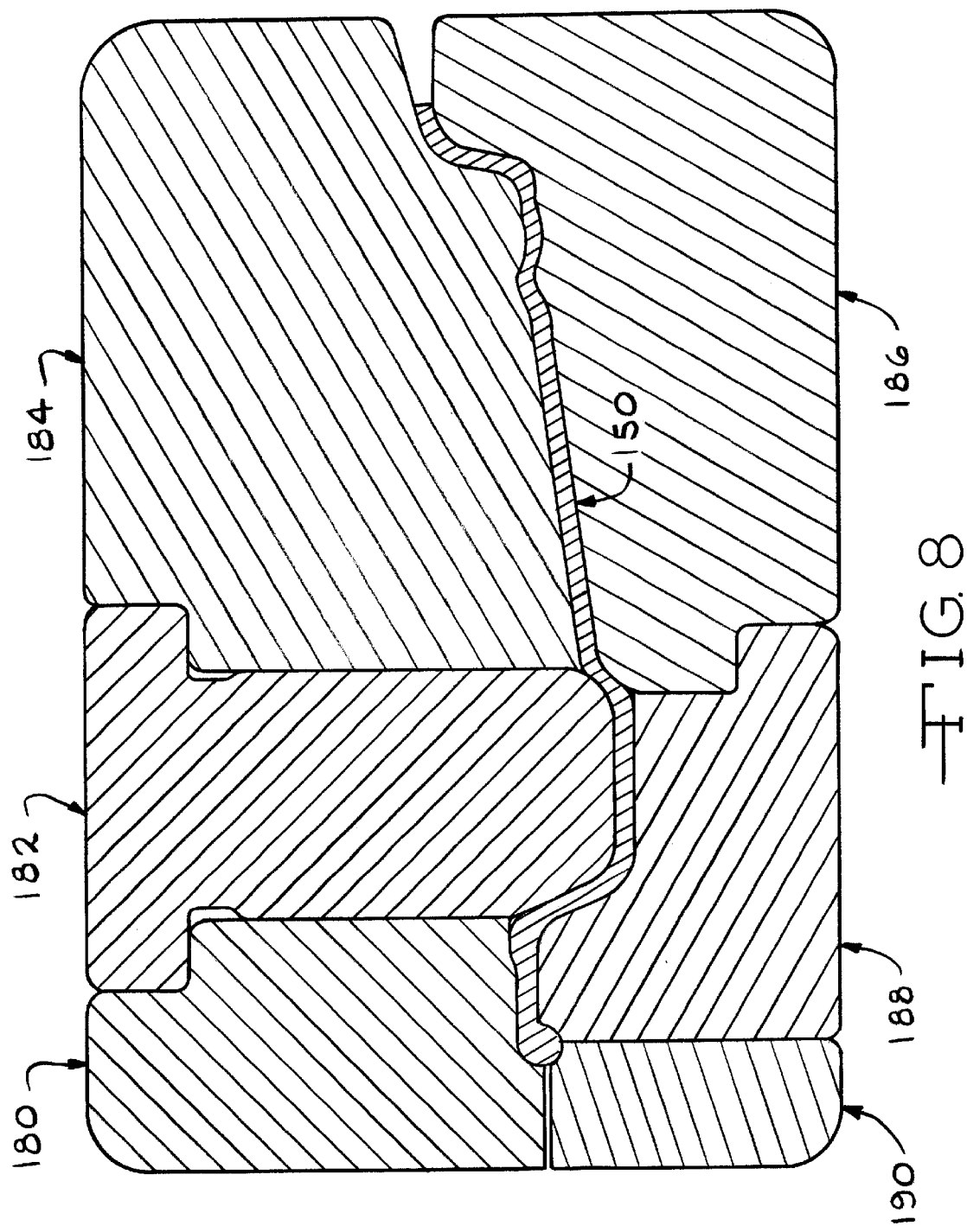
FIG. 8 is a cross sectional view showing a final roll operation of the wheel rim into a fully formed wheel rim in accordance with the present invention.
Figure 9:
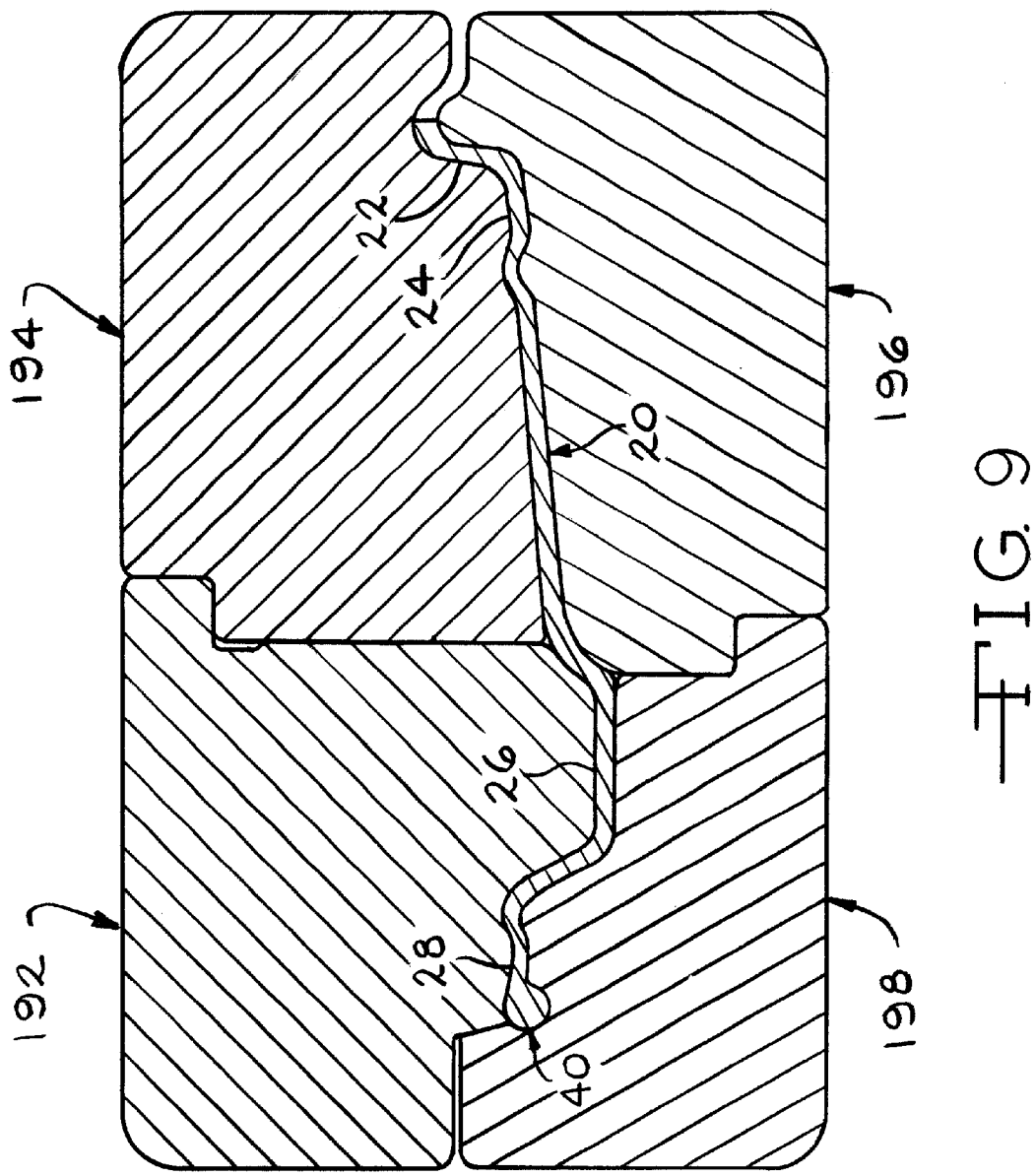
FIG. 9 is a cross sectional view showing an expanding operation of the fully formed wheel rim into the finished wheel rim in accordance with the present invention.
Figure 10:
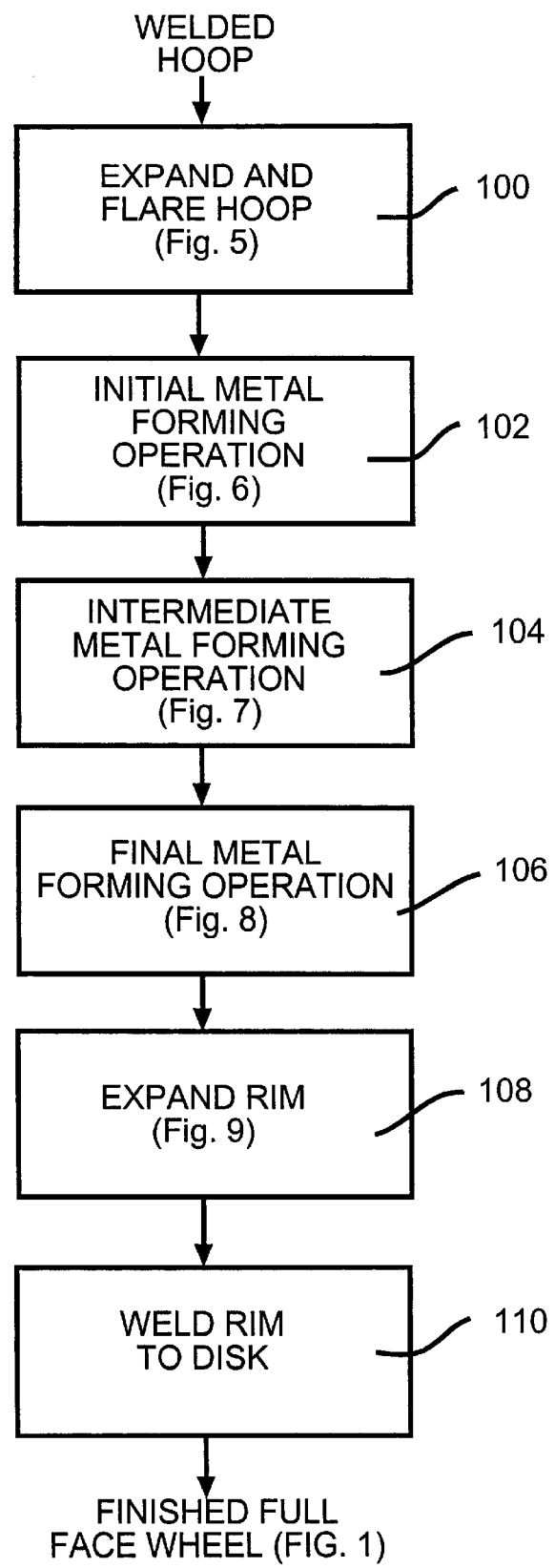
FIG. 10 is a block diagram showing a sequence of steps for producing the wheel in accordance with the present invention.

Following this, the partially formed wheel rim 140 is subjected to a final metal forming operation to produce a near final formed wheel rim 150 during step 106 as shown in FIG. 8. To accomplish this, the partially formed wheel rim 140 is supported and engaged by a plurality of die members 180, 182, 184, 186, 188 and 190 during step 106 so as to produce the near final formed wheel rim 150. In particular, as shown on the left side of FIG. 8, an outboard end of the partially formed wheel rim 140 is engaged by the die members 180, 188 and 190 which are operative to form the extruded outer end 40 of the wheel rim 20. Next, in step 108, the near final formed wheel rim 150 is subjected to a final expanding operation as shown in FIG. 9 to produce the finished wheel rim 20. As shown in FIG. 9, during step 108 the wheel rim is expanded by die members 192, 194, 196, and 198. Although the series of metal forming operations of steps 100–108 have been illustrated and described as preferably being die forming operations, other metal forming operations can be used in one or more of the steps 100–108 if desired. Other suitable metal forming operations can include, for example, forward or reverse flow spinning operations, roll forming operations, pressing operations, or any suitable combinations of roll forming, flow spinning, and pressing operations which are operative to cause deformation, reshaping, and/or thinning of the metal to produce the wheel rim 20 having the desired profile. In step 10, the finished partial wheel rim 20 is secured to the preformed full face wheel disc 30 by welding to produce the finished full face vehicle wheel 10.

Figure 2A:
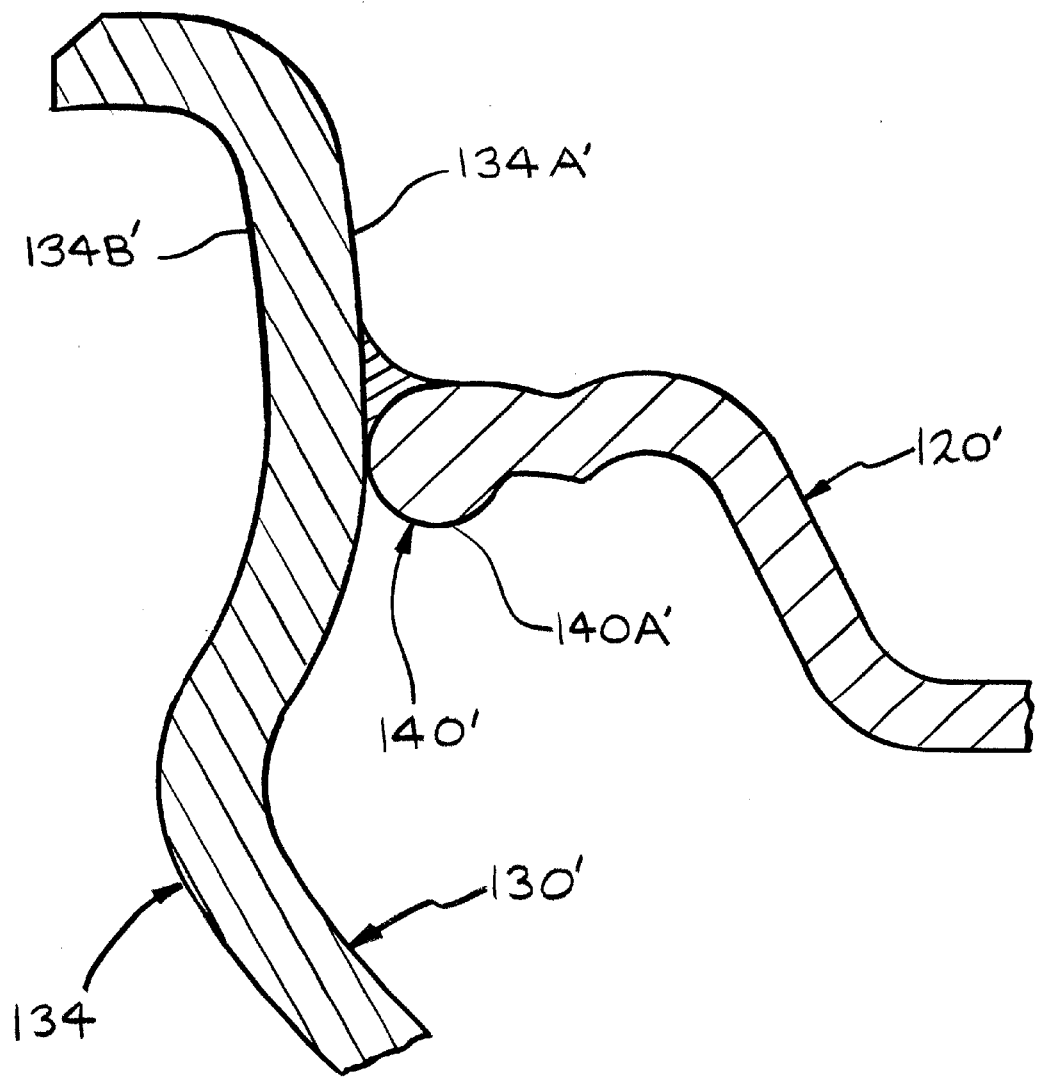
FIG. 2A is an enlarged cross-sectional view similar to FIG. 2 showing the weld joint geometry for a second embodiment of a vehicle wheel constructed in accordance with the present invention.
Figure 11:
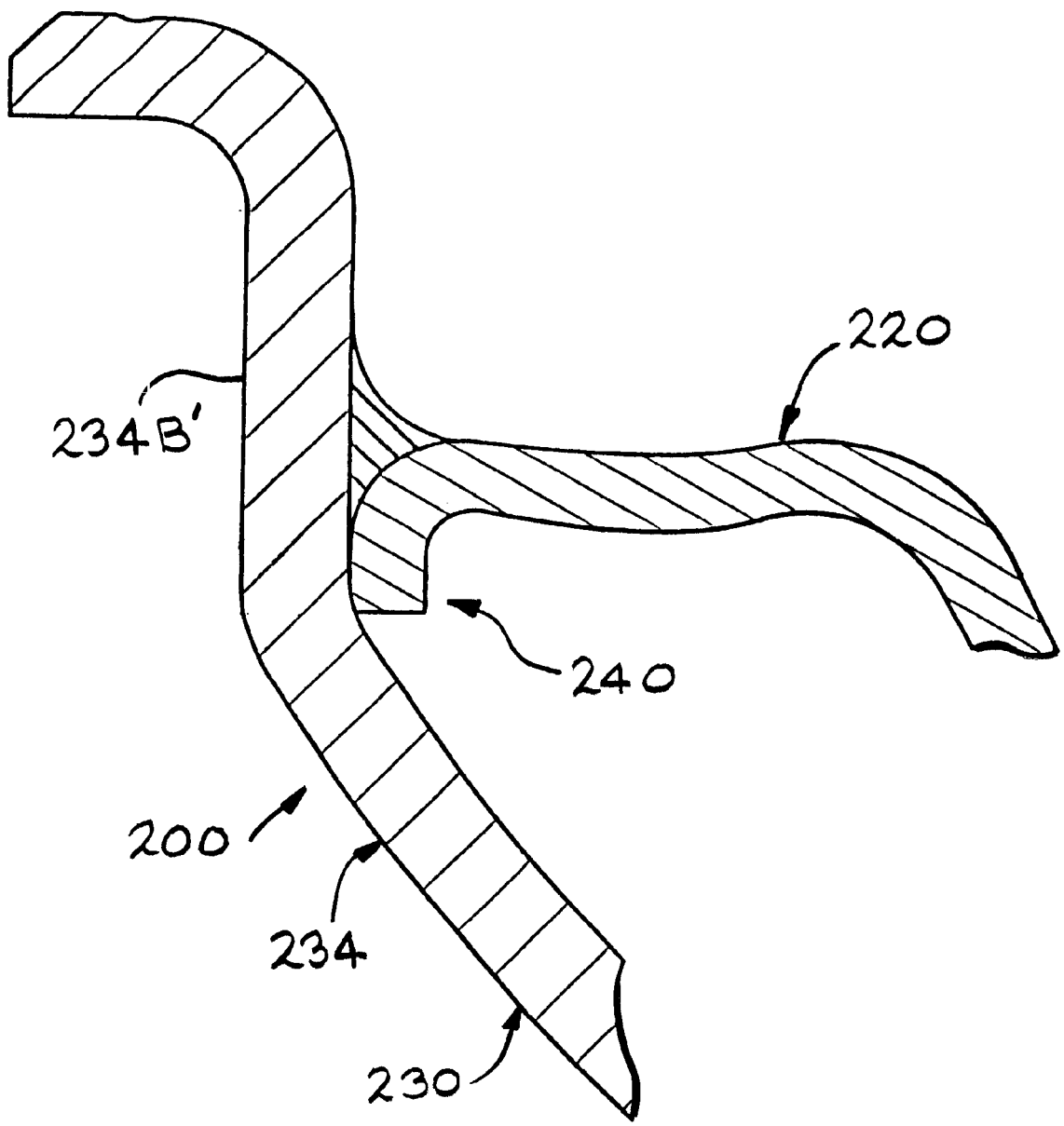
FIG. 11 is a cross sectional view showing a portion of a prior art full face vehicle wheel.

One advantage of the present invention is that by forming the outboard end of the wheel rim 20 with the bubble head shaped outer end 40 so as to provide a single point of contact surface C for attaching the wheel rim 20 to the wheel disc 30, the lateral runout of the finished full face vehicle wheel 10 is reduced. Also, the bubble head shaped outer end 40 increases the design potentials of the associated wheel disc 30 since a generally flat fit-up surface profile is not needed. This can be seen comparing FIG. 2A to prior art FIG. 11. As shown in FIG. 2A, the length of a generally outer flat surface 134B' in an outer annular portion 134 of the wheel disc 130 can be significantly reduced (or all together eliminated as shown in this embodiment), compared to the length of a generally outer flat surface 234B in an outer annular portion 234 of a prior art wheel disc 230 of a similar sized prior art full face vehicle wheel 200 having a wheel rim 220 provided with an inturned flange 240 at an inboard end thereof, as shown in prior art FIG. 11. As a result of this, the styling of the associated full face wheel 10 of the present invention can be improved compared to the styling of the prior art full face vehicle wheel 200 shown in prior art FIG. 11.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A full face vehicle wheel comprising:

a wheel disc defining an axis and including a body having a centrally located wheel mounting surface and an outer annular portion, said outer annular portion defining an outboard tire bead seat retaining flange of said full face vehicle wheel, said outer annular portion including an outer surface and an inner surface, said inner surface of said outer annular portion defining an inner fit up surface of said wheel disc; and a wheel rim joined to said wheel disc and including an inboard tire bead seat retaining flange, an inboard tire bead seat, an axially extending well, and an outboard tire bead seat, said outboard tire bead seat terminating at an outer end, said outer end being a generally circular shaped outer end which is defined by an arc greater than 90 degrees, said circular shaped section of said outer end of said wheel rim defining an outer non-flat point of contact surface;

wherein when said outer non-flat point of contact surface of said circular shaped section of said outer end of said wheel rim is positioned adjacent said inner fit up surface of said wheel disc, said outer non-flat point of contact surface of said wheel rim abuts said inner fit up surface of said wheel disc and at least a portion of said outer non-flat point of contact surface of said outer end of said wheel rim is spaced from said inner fit up surface of said wheel disc to form a generally annular groove for receiving a weld to join said wheel rim and said wheel disc together and produce the finished full face vehicle wheel.

2. The full face vehicle wheel defined in claim 1 wherein said inner fit up surface of said wheel disc is a generally non-flat surface.

3. The full face vehicle wheel defined in claim 1 wherein said inner fit up surface of said wheel disc is a generally flat surface.

4. The full face vehicle wheel defined in claim 1 wherein said outer end of said wheel rim is an extruded outer end.

5. The full face vehicle wheel defined in claim 1 wherein said circular shaped outer end is defined by an arc of at least 120 degrees.

6. A method for producing a full face vehicle wheel comprising the steps of:

(a) providing a wheel disc defining an axis and including a body having a centrally located wheel mounting surface and an outer annular portion, the outer annular portion defining an outboard tire bead seat retaining flange of the full face vehicle wheel, the outer annular portion including an outer surface and an inner surface, the inner surface of the outer annular portion defining an inner fit up surface of the wheel disc;

(b) providing a wheel rim including an inboard tire bead seat retaining flange, an inboard tire bead seat, an axially extending well, and an outboard tire bead seat, the outboard tire bead seat terminating at an outer end, the outer end being a generally circular shaped outer end which is defined by an arc greater than 90 degrees, the circular shaped section of the outer end of the wheel rim defining an outer non-flat point of contact surface;

(c) positioning the outer non-flat point of contact surface of the circular shaped section of the outer end of the wheel rim adjacent the inner fit up surface of the wheel disc wherein the outer non-flat point of contact surface of the wheel rim abuts the inner fit up surface the wheel disc at a single point of contact therebetween and at least a portion of the outer non-flat point of contact surface of the outer end of the wheel rim is spaced from the inner fit up surface of the wheel disc to form a generally annular groove for receiving a weld;

(d) depositing a weld in the annular groove to secure the wheel disc to the wheel rim and produce the finished full face vehicle wheel.

7. The method according to claim 6 wherein the inner fit up surface of the wheel disc is a generally non-flat surface.

8. The method according to claim 6 wherein the inner fit up surface of the wheel disc is a generally flat surface.

9. The method according to claim 6 wherein the outer end of the wheel rim is an extruded outer end.

* * * * *